US010496470B2

(12) United States Patent
Alavi et al.

(10) Patent No.: US 10,496,470 B2
(45) Date of Patent: Dec. 3, 2019

(54) ERROR RECOVERY HANDLING

(71) Applicant: WESTERN DIGITAL TECHNOLOGIES, INC., Irvine, CA (US)

(72) Inventors: Parvaneh Alavi, Irvine, CA (US); Kai-Lung Cheng, Irvine, CA (US); Yun-Tzuo Lai, Irvine, CA (US); Haining Liu, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 265 days.

(21) Appl. No.: 15/396,371

(22) Filed: Dec. 30, 2016

(65) Prior Publication Data
US 2018/0189149 A1 Jul. 5, 2018

(51) Int. Cl.
*G06F 11/00* (2006.01)
*G06F 11/07* (2006.01)

(52) U.S. Cl.
CPC ...... *G06F 11/0793* (2013.01); *G06F 11/0727* (2013.01)

(58) Field of Classification Search
CPC ............. G06F 11/1469; G06F 11/1451; G06F 2201/82; G06F 2201/805
USPC .......................................................... 714/15
See application file for complete search history.

(56) References Cited

U.S. PATENT DOCUMENTS

| | | | | |
|---|---|---|---|---|
| 8,040,727 B1* | 10/2011 | Harari | ................... | G06F 3/0616 365/185.09 |
| 9,442,833 B1* | 9/2016 | Johansson | ............... | G06F 12/00 |
| 2004/0210803 A1* | 10/2004 | Cheng | .................... | G11C 29/44 714/710 |
| 2011/0283165 A1* | 11/2011 | Nishiyama | .......... | G06F 11/1068 714/773 |
| 2014/0215289 A1* | 7/2014 | Trezise | ................... | G06F 11/00 714/763 |
| 2014/0281121 A1* | 9/2014 | Karamcheti | ............ | G06F 3/061 711/102 |
| 2019/0205244 A1* | 7/2019 | Smith | ................. | G06F 12/0246 |

* cited by examiner

*Primary Examiner* — Yair Leibovich
(74) *Attorney, Agent, or Firm* — Morgan, Lewis & Bockius LLP

(57) ABSTRACT

A device that provides error recovery handling includes a processor that is configured to receive an error recovery request including error type information and a page address, where the error type information is mapped to a first error recovery technique. The processor may be configured to determine whether an error count associated with the flash memory circuit satisfies a first criterion and an error map associated with the flash memory circuit satisfies a second criterion, where the error count indicates a number of read errors that have occurred and the error map indicates blocks in which the read errors have occurred. The processor may be configured to utilize a second technique to attempt to recover data when the first and second criterions are satisfied, otherwise utilize the first technique to attempt to recover data, where the second technique is associated with recovering data stored in an offline flash memory circuit.

20 Claims, 5 Drawing Sheets

ERROR RECOVERY HANDLING

TECHNICAL FIELD

The present description relates generally to error recovery handling including error recovery handling for flash memory devices.

BACKGROUND

In a flash memory system, when a read error occurs an error recovery request may be generated and forwarded to an error recovery handler. The error recovery handler may utilize one or more error recovery techniques to attempt to recover the data for which the read error occurred. The error recovery handler may select a particular error recovery technique to attempt to recover the data based on the type of read error that occurred.

SUMMARY

The disclosed subject matter relates to a device that includes at least one processor. The at least one processor may be configured to receive an error recovery request comprising error type information and an address of a page of a flash memory circuit for which a read error has occurred, wherein the error type information of the error recovery request is mapped to a first error recovery technique. The at least one processor may be further configured to determine whether an error count associated with the flash memory circuit satisfies a first criterion and a block error map associated with the flash memory circuit satisfies a second criterion, wherein the error count indicates a number of read errors that have occurred on the flash memory circuit and the block error map indicates one or more blocks of the flash memory circuit in which the read errors have occurred. The at least one processor may be further configured to utilize a second error recovery technique to attempt to recover data stored in the page when the first and second criterions are satisfied, otherwise utilize the first error recovery technique to attempt to recover the data stored in the page, wherein the second error recovery technique is associated with recovering data stored in an offline flash memory circuit.

In another aspect, a method may include receiving an error recovery request corresponding to a page of a flash memory circuit, wherein the error recovery request indicates an error type that is mapped to a first error recovery technique. The method may further include determining a likelihood that data stored in the page of the flash memory circuit can be recovered using the first error recovery technique. The method may further include, when the likelihood that the data stored in the page of the flash memory circuit can be recovered using the first error recovery technique satisfies a criterion, utilizing the first error recovery technique to attempt to recover the data stored in the page of the flash memory circuit, otherwise utilizing a second error recovery technique to attempt to recover the data stored in the page of the flash memory circuit without utilizing the first error recovery technique.

In another aspect, a system may include flash memory circuits each comprising blocks, each of the blocks including one or more pages, a random access memory (RAM) configured to store: a mapping between error types and error recovery techniques, an error count for each of the flash memory circuits, and a block error map for each of the flash memory circuits, wherein the error count for each respective flash memory circuit indicates a number of read errors that have occurred on each respective flash memory circuit and the block error map for each respective flash memory circuit indicates each of the blocks of each respective flash memory circuit in which at least one of the read errors has occurred, an interface communicatively coupled to a host device, and a controller. The controller may be configured to receive error recovery requests corresponding to read errors that have occurred on the flash memory circuits, each of the error recovery requests indicating a page of one of the flash memory circuits and one of the error types. The controller may be further configured to, for each of the error recovery requests, identify one of the error recovery techniques mapped to the one of the error types, determine whether the error count for the one of the flash memory circuits on which the corresponding read error occurred exceeds a first threshold and whether the block error map for the one of the flash memory circuits indicates that the read errors occurred in at least a number of the blocks of the one of the flash memory circuits, and utilize an other one of the error recovery techniques to attempt to recover data stored in the page when the error count exceeds the first threshold and the block error map indicates that the read errors occurred in the at least the number of the blocks, otherwise utilize the one of the error recovery techniques to attempt to recover the data stored in the page.

In another aspect, a system may include means for receiving an error recovery request comprising error type information and an address of a page of a flash memory circuit for which a read error has occurred, wherein the error type information of the error recovery request is mapped to a first error recovery technique. The system may further include means for determining whether an error count associated with the flash memory circuit satisfies a first criterion and a block error map associated with the flash memory circuit satisfies a second criterion, wherein the error count indicates a number of read errors that have occurred on the flash memory circuit and the block error map indicates one or more blocks of the flash memory circuit in which the read errors have occurred. The system may further include means for utilizing a second error recovery technique to attempt to recover data stored in the page when the first and second criterions are satisfied, otherwise utilize the first error recovery technique to attempt to recover the data stored in the page, wherein the second error recovery technique is associated with recovering data stored in an offline flash memory circuit.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for error recovery handling, an error recovery manager of a flash memory device maintains an error count and a block error map for each flash memory circuit (e.g. a single flash memory die/chip) in the flash memory device. The error count for a flash memory circuit indicates the total number of read errors that have occurred with respect to the flash memory circuit and the block error map for a flash memory circuit indicates the particular blocks of the flash memory circuit in which the read errors have occurred. When the error count of a given flash memory circuit exceeds a first threshold, and the block error map of the flash memory circuit indicates that the errors have occurred across a threshold percentage of the blocks, the error recovery manager handles error recovery requests for pages of the flash memory circuit by utilizing an error recovery technique for recovering data from offline flash memory circuits, rather than selecting an error recovery technique based on the error types corresponding to the error recovery requests.

For example, the error recovery manager may bypass performing error recovery for the flash memory circuit using error recovery techniques that rely on the flash memory circuit being online, such as read retry and error correction coding error recovery techniques, and the error recovery manager may instead perform error recovery for the flash memory circuit using error recovery techniques that rely on redundancy data that is stored on other flash memory circuits in the flash memory device, such as redundant array of independent disks (RAID) error recovery techniques. In this manner, the subject system avoids utilizing processing, power, memory, and/or bandwidth resources to perform error recovery techniques that are unlikely to recover data from a given flash memory circuit of the flash memory device.

Figure 1:
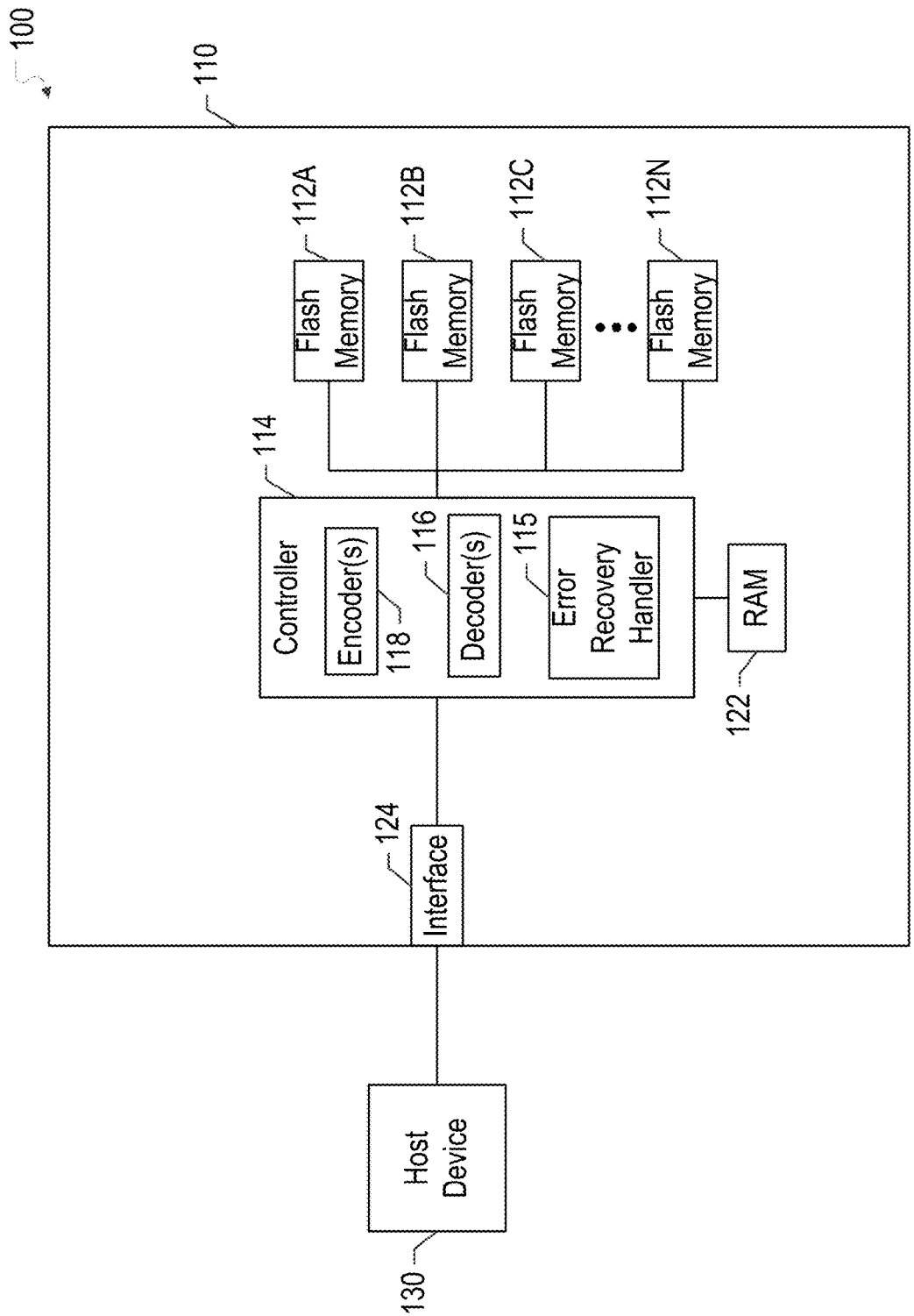
FIG. 1 illustrates an example flash memory system that may implement a system for error recovery handling in accordance with one or more implementations.

FIG. 1 illustrates an example flash memory system 100 that may implement a system for error recovery handling in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The system 100 includes a flash memory device 110 and a host device 130. The flash memory device 110 includes one or more flash memory circuits 112A-N, a controller 114, a random access memory (RAM) 122 and an interface 124. The controller 114 includes one or more decoders 116, such as error-correcting code (ECC) decoders, one or more encoders 118, such as ECC encoders, and error recovery handler 115. The one or more decoders 116, the one or more encoders 118, and/or the error recovery handler 115 may be one or more dedicated circuits of the controller 114, may be implemented via firmware running on the controller 114, and/or may be one or more circuits separate from the controller 114.

The interface 124 of the flash memory device 110 couples the flash memory device 110 to the host device 130. The interface 124 may be a wired interface, such as a Personal Computer Memory Card International Association (PCM-CIA) interface, a Serial AT Attachment (SATA) interface, a universal serial bus (USB) interface, or generally any wired interface. Alternatively, or in addition, the interface 124 may be a wireless interface, such as wireless SATA, Bluetooth, or generally any wireless interface.

The controller 114 is operable to read data from, and write data to, the flash memory circuits 112A-N. For example, the controller 114 receives data, such as a stream of data, from the host device 130 via the interface 124, where the data is then written to one or more of the flash memory circuits 112A-N. The flash memory circuits 112A-N may each include one or more physical blocks, such as NAND blocks and/or NOR blocks. The physical blocks may each include one or more physical pages. The controller 114 may utilize the RAM 122 to assist with reading/writing data to/from the flash memory circuits 112A-N.

For example, the RAM 122 may be used as a buffer for rate control, or may otherwise be used to store information (e.g., error counts, block error maps, variables, physical block status, logical to physical address mapping tables, endurance/retention data, settings, etc.) utilized by the controller 114 to read/write data to/from the flash memory circuits 112A-N, as well as recover data from the flash memory circuits 112A-N. Since the RAM 122 may be volatile memory, the controller 114 may permanently store information in one or more of the flash memory circuits 112A-N. When the flash memory device 110 is powered on, the controller 114 may retrieve the information from the one or more flash memory circuits 112A-N and store the information in the RAM 122.

The controller 114 may implement one or more algorithms or techniques in conjunction with reading and/or writing data to the flash memory circuits 112A-N, such as security techniques (e.g. encryption), error correction coding techniques (e.g. low-density parity-check (LDPC)), compression techniques, redundancy techniques (e.g. redundant array of independent disks (RAID) techniques), etc. For example, the controller 114 may use redundancy techniques by generating logical sets of physical blocks across multiple flash memory circuits 112A-N, which may be referred to as stripes, superblocks, or sets of blocks. The controller 114 may write data to a given set of blocks as a single unit. In this manner, the data is spread out across multiple of the flash memory circuits 112A-B and may therefore be recoverable if one or more of the flash memory circuits fails. Example logical groupings of physical blocks of the flash memory circuits 112A-N are discussed further below with respect to FIG. 2

The error recovery handler 115 may include one or more circuits for recovering data when a read error occurs, such as by utilizing the error correction coding and/or redundancy of the data written to the flash memory circuits 112A-N. For example, the error recovery handler 115 may receive error recovery requests, such as from the controller 114, that indicate a page of one of the flash memory circuits 112A-N in which a read error has occurred and include error type information that indicates an error type of the read error that occurred. The error recovery handler 115 may select an error recovery technique for attempting to recover the data associated with the read error based on, for example, the error type information included in the error recovery request.

For example, each error type that may occur in the flash memory device 110 may be mapped to an error recovery technique. The error recovery technique mapped to a given error type may be based on the severity of the read error corresponding to the error type. For example, less severe error types may be mapped to read retry error recovery techniques, more severe error types may be mapped to error correction coding error recovery techniques, and the most severe error types may be mapped to redundancy error recovery techniques. If the error recovery handler 115 is unable to recover the data using the error recovery technique mapped to the error type, the error recovery handler 115 may progress through the error recovery techniques mapped to each successively more severe error type until the redundancy error recovery technique is reached. An example error recovery handler 115 and example error recovery techniques are discussed further below with respect to FIG. 3.

In the subject system, the error recovery handler 115 maintains read error information for each of the flash memory circuits 112A-N. The read error information may include, for example, an error count that indicates a total number of read errors that have occurred on a given flash memory circuit 112A and a block error map that indicates the blocks of the given flash memory circuit 112A where at least one read error occurred. Example error counts and block error maps are discussed further below with respect to FIG. 4. The read error information may be used by the error recovery handler 115 to determine when the error recovery technique that is mapped to a given error type is unlikely to be able to recover the requested data. In this instance, the error recovery handler 115 may bypass the error recovery technique mapped to the error type and move to the error recovery technique mapped to the next successive error type in severity, and/or the error recovery handler 115 may move directly to the redundancy data error recovery technique.

Thus, the error recovery handler 115 is able to avoid utilizing resources for the error recovery technique mapped to the error type when the error recovery technique mapped to the error type is unlikely to be successful in recovering the requested data. An example process of error recovery handling that utilizes error counts and block error maps of the flash memory circuits 112A-N is discussed further below with respect to FIG. 5.

In one or more implementations, one or more of the controller 114, the error recovery handler 115, the decoder 116, the encoder 118, and/or the interface 124, and/or one or more portions thereof, may be implemented in software (e.g., firmware, subroutines, and/or code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, and/or any other suitable devices) and/or a combination of both.

Figure 2:
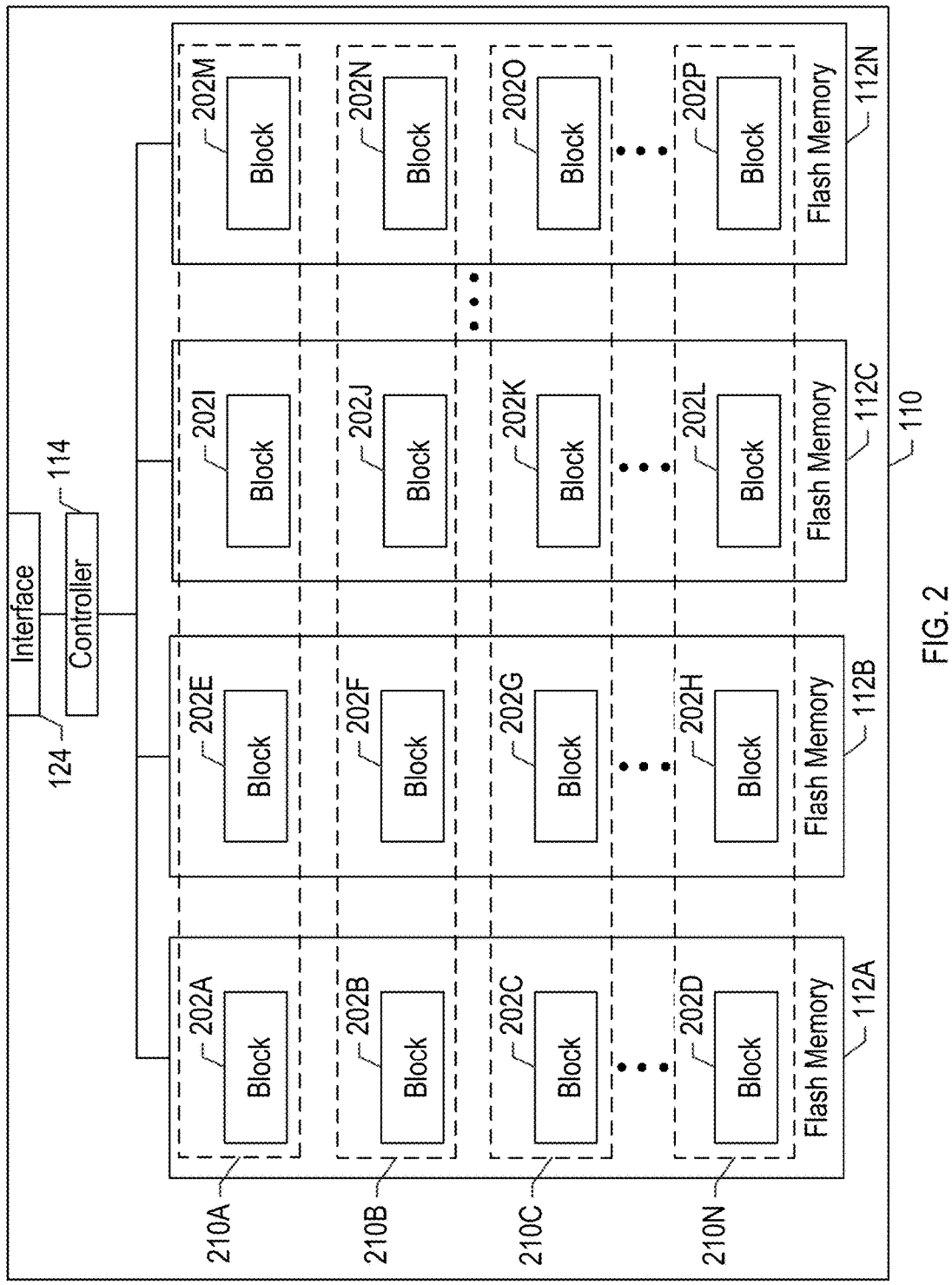
FIG. 2 illustrates example logical groupings of physical blocks of flash memory circuits in an example flash memory device in accordance with one or more implementations.

FIG. 2 illustrates example logical groupings of physical blocks of flash memory circuits 112A-N in an example flash memory device 110 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example flash memory device 110 includes the interface 124, the controller 114, and one or more flash memory circuits 112A-N. The flash memory circuits 112A-N each include one or more physical blocks 202A-P of flash memory, which may also be referred to as blocks 202A-P. The flash memory circuit 112A includes the blocks 202A-D, the flash memory circuit 112B includes the blocks 202E-H, the flash memory circuit 112C includes the blocks 202I-L, and the flash memory circuit 112N includes the blocks 202M-P. Each of the blocks 202A-P may include one or more physical pages of flash memory. The individual physical pages of the blocks 202A-P may be the smallest unit that can be written to in the flash memory circuits 112A-N and may be, for example, 8-16 kilobytes in size. In one or more implementations, a flash memory circuit 112A may be 16 Gigabytes in size and may include 4,252 blocks each of which includes 256 pages with each page storing 17,760 bytes.

As shown in FIG. 2, the controller 114 logically groups the blocks 202A-P of the flash memory circuits 112A-N into logical sets of blocks 210A-N, where each of the sets of blocks 210A-N includes at least one block from each of the flash memory circuits 112A-N. The error recovery handler 115 may use each of the sets of blocks 210A-N as individual RAID stripes with parity/ECC data to perform data recovery when requested data cannot be read one or more blocks 202A-P within the individual sets of blocks 210A-N. In this manner, data written to the flash memory circuits 112A-N can still be recovered when one or more of the flash memory circuits 112A-N, and/or one more of the blocks 202A-P therein, fails. In one or more implementations, the sets of blocks 210A-N may be referred to as stripes, superblocks, logical units, etc.

As shown in FIG. 2, the set of blocks 210A includes the block 202A of the flash memory circuit 112A, the block 202E of the flash memory circuit 112B, the block 202I of the flash memory circuit 112C, and the block 202M of the flash memory circuit 112N. The set of blocks 210B includes the block 202B of the flash memory circuit 112A, the block 202F of the flash memory circuit 112B, the block 202I of the flash memory circuit 112C, and the block 202N of the flash memory circuit 112N. The set of blocks 210C includes the block 202C of the flash memory circuit 112A, the block 202G of the flash memory circuit 112B, the block 202K of the flash memory circuit 112C, and the block 202O of the flash memory circuit 112N. The set of blocks 210N includes the block 202D of the flash memory circuit 112A, the block 202H of the flash memory circuit 112B, the block 202L of the flash memory circuit 112C, and the block 202P of the flash memory circuit 112N.

In one or more implementations, one or more of the controller 114 and/or the interface 124, and/or one or more portions thereof, may be implemented in software (e.g., firmware, subroutines, and/or code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, and/or any other suitable devices) and/or a combination of both.

Figure 3:
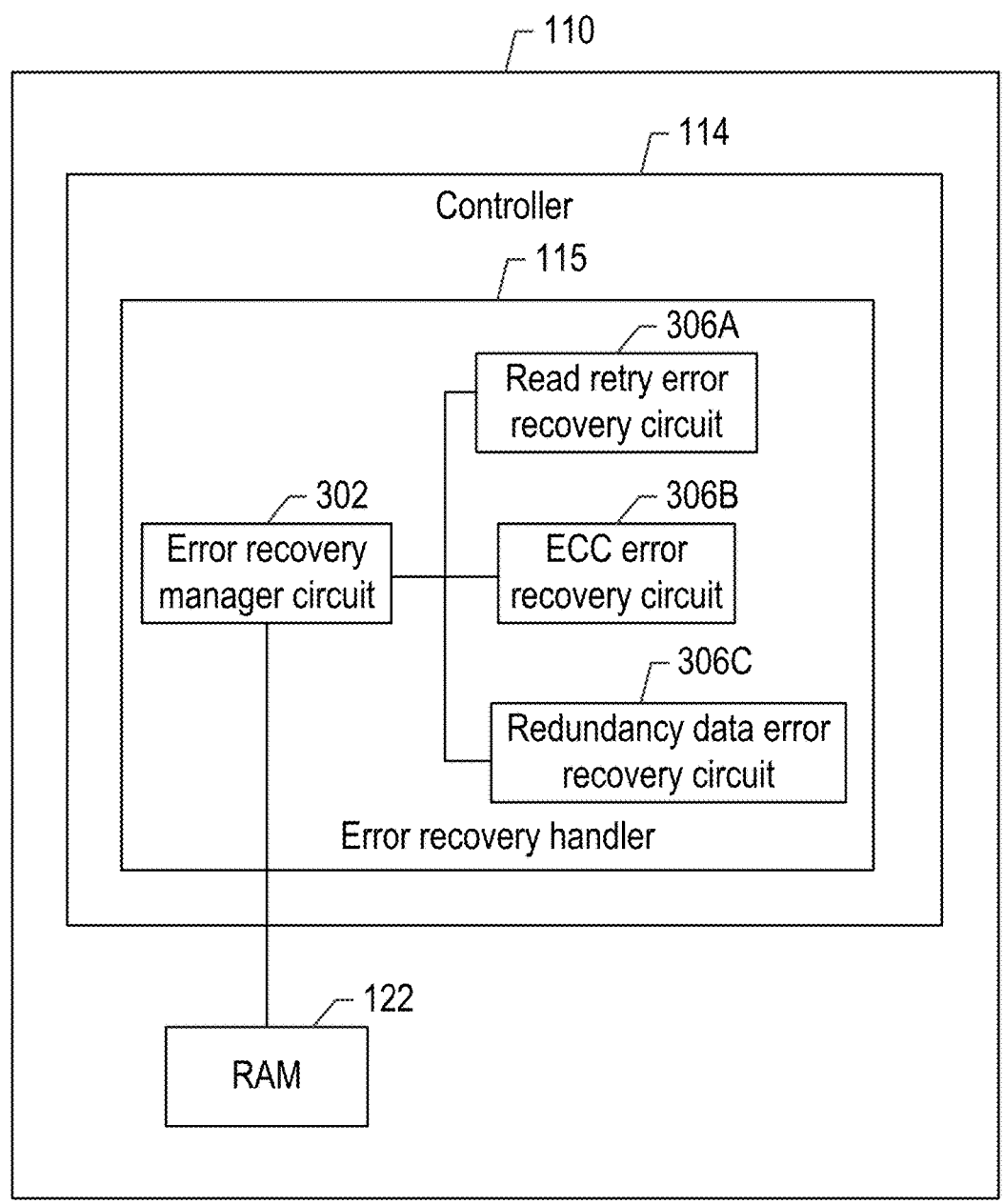
FIG. 3 illustrates an example error recovery handler in an example flash memory device in accordance with one or more implementations.

FIG. 3 illustrates an example error recovery handler 115 in an example flash memory device 110 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example flash memory device 110 includes RAM 122 and the controller 114 which includes the error recovery handler 115. The error recovery handler 115 includes an error recovery manager circuit 302, a read retry error recovery circuit 306A, an error correction coding (ECC) error recovery circuit 306B, and a redundancy data error recovery circuit 306C. For explanatory purposes, the error recovery manager circuit 302 and the error recovery circuits 306A-C are illustrated as being part of the controller 114. However, one or more of the error recovery manager circuit 302 and/or the error recovery circuits 306A-C may be physically separate from the controller 114, such as separate circuits and/or separate hardware.

The error recovery circuits 306A-C each implements a different error recovery technique that may be utilized to attempt to recover data from a page (or multiple pages) in which a read error occurred. For example, the read retry error recovery circuit 306A may implement an error recovery technique that performs one or more read retries, the ECC error recovery circuit 306B may implement an error recovery technique that utilizes the error correction coding (e.g., LDPC) of the data stored on the flash memory circuits 112A-N, and the redundancy data error recovery circuit 306C may implement an error recovery technique that utilizes the redundancy, such as through RAID, of the data stored on the flash memory circuits 112A-N.

Accordingly, each of the error recovery circuits 306A-C performs one or more read accesses on one or more of the flash memory circuits 112A-N to implement the error recovery techniques. For example, the read retry error recovery circuit 306A may perform one or two read accesses on one of the flash memory circuits 112A-N that includes the page in which a read error occurred. The ECC error recovery circuit 306B may perform, for example, eight or nine read accesses on one of the flash memory circuits 112A-N that includes the page in which the read error occurred. The redundancy data error recovery circuit 306C may perform, for example, thirty to forty read accesses on one or more of the flash memory circuits 112A-N.

The error recovery manager circuit 302 may store (e.g., in the RAM 122), and/or be preconfigured with, a mapping between each different error type and one of the error recovery circuits 306A-C to be utilized for attempting to recover the data stored in the page when a read error having the error type occurs. Since, the number of read accesses utilized by the error recovery circuits 306A-C increases from the read retry error recovery circuit 306A (e.g., 1-2 read accesses) to the ECC error recovery circuit 306B (e.g., 8-9 read accesses) to the redundancy data error recovery circuit 306C (e.g., 30-40 read accesses), the error types may be mapped to the error recovery circuit that is capable of recovering data when the error type occurs utilizing the fewest number of read accesses.

For example, data integrity error types (e.g., the returned data is not what the host device 130 expected) and erased page error types (e.g., the host device 130 requested a page that returned no data) may be mapped to the read retry error recovery circuit 306A, unrecoverable error types may be mapped to the ECC error recovery circuit 306B, and flash memory circuit offline (e.g. die offline) error types and cyclic redundancy check (CRC) error types may be mapped to the redundancy data error recovery circuit 306C.

In operation, when the controller 114 encounters a read error when attempting to read data from a page of one of the blocks 202A-P of one of the flash memory circuits 112A-N, the controller 114 communicates an error recovery request to the error recovery manager circuit 302. The error recovery request may include error type information that identifies an error type corresponding to the read error and may also include an address or identifier of the page in which the read error occurred. The error recovery manager circuit 302 attempts to recover the data stored in the page in which the read error occurred using the one of the error recovery circuits 306A-C mapped to the error type of the error recovery request. For example, the error recovery manager circuit 302 may pass the error recovery request to the one of the error recovery circuits 306A-C that is mapped to the error type.

If the error recovery request is passed to the read retry error recovery circuit 306A and the read retry error recovery circuit 306A is unable to recover the data stored in the page, the error recovery manager circuit 302 passes the error recovery request to the ECC error recovery circuit 306B. If the ECC error recovery circuit 306B is unable to recover the data stored in the page, the error recovery manager circuit 302 passes the error recovery request to the redundancy data error recovery circuit 306C. Thus, if an error recovery request having an error type mapped to the read retry error recovery circuit 306A is passed to the ECC error recovery circuit 306B and then to the redundancy data error recovery circuit 306C, an additional 9-11 read accesses may be performed as compared to if the error recovery request had been passed directly to the redundancy data error recovery circuit 306C. In instances when one of the flash memory circuits 112A-N is beginning to malfunction, e.g., due to age or other factors, the number of read errors may increase dramatically and the extra 9-11 read accesses for each such read error may overwhelm the flash memory device 110.

In the subject system, the error recovery manager circuit 302 maintains, e.g., in the RAM 122, an error count and a block error map for each of the flash memory circuits 112A-N. Example data structures storing the error counts and the block error maps are discussed further below with respect to FIG. 4. The error count for a given flash memory circuit 112A indicates the total number of read errors that have occurred on the flash memory circuit 112A. The block error map indicates the particular blocks of the given flash memory circuit 112A in which at least one of the read errors has occurred. In one or more implementations, the error recovery manager circuit 302 may reset the error counts and/or the block error maps at periodic intervals, such as every second, every ten seconds, or generally any periodic or aperiodic interval.

When the error recovery manager circuit 302 receives an error recovery request for a page that has an error type mapped to the read retry error recovery circuit 306A or the ECC error recovery circuit 306B, the error recovery manager circuit 302 determines a likelihood of the respective error recovery circuits 306A-B being able to recover the data stored in the page, such as based on the error count and/or block error map of the one of the flash memory circuits 112A-N that includes the page. For example, if the error count exceeds a certain threshold and/or the block error map indicates that the read errors are occurring in at least a certain percentage (or number) of blocks of the one of the flash memory circuits 112A-N, the error recovery manager circuit 302 may determine that there is a low likelihood of either of the respective error recovery circuits 306A-B being able to recover the data stored in the page.

When the error recovery manager circuit 302 determines that there is a low likelihood of the respective error recovery circuits 306A-B being able to recover the data stored in the page, the error recovery manager circuit 302 bypasses the one of the error recovery circuits 306A-B mapped to the error type and passes the error recovery request directly to the redundancy data error recovery circuit 306C. An example process of bypassing the one of the error recovery circuits 306A-B mapped to the error type of error recovery requests is discussed further below with respect to FIG. 5.

In one or more implementations, one or more of the controller 114, the error recovery handler 115, the error recovery manager circuit 302, the read retry error recovery circuit 306A, the ECC error recovery circuit 306B, and/or the redundancy data error recovery circuit 306C, and/or one or more portions thereof, may be implemented in software (e.g., firmware, subroutines, and/or code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, and/or any other suitable devices) and/or a combination of both.

Figure 4:
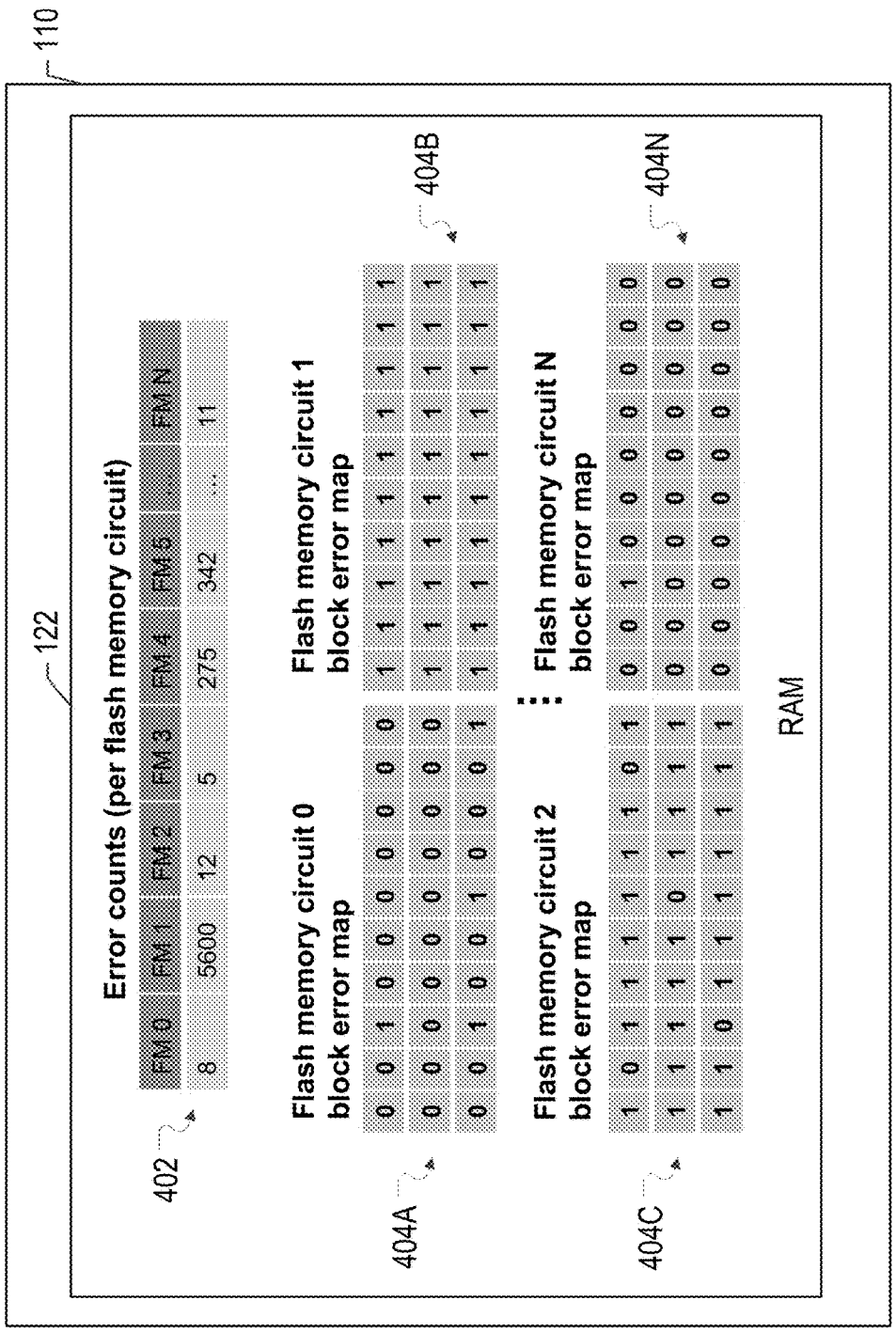
FIG. 4 illustrates example data structures stored in random access memory of an example flash memory device in accordance with one or more implementations.

FIG. 4 illustrates example data structures stored in random access memory 122 of an example flash memory device 110 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example data structures stored in the random access memory 122 include an error count table 402 and one or more block error maps 404A-N. The error count table 402 may store a separate error count for each of the flash memory circuits 112A-N. Each error count may reflect the total number of read errors that have occurred in the corresponding one of the flash memory circuits 112A-N. Thus, when an error recovery request is received by the error recovery manager circuit 302 for one of the flash memory circuits 112A-N, such as the flash memory circuit 112A, the error recovery manager circuit 302 may increment the error count for the flash memory circuit 112A.

The block error maps 404A-N may be, e.g., bitmaps and may indicate the particular blocks 202A-P of each of the flash memory circuits 112A-N in which at least one read error has occurred. Thus, the block error map 404A indicates that at least one read error has occurred in three of the blocks 202A-D of the flash memory circuit 112A. The block error map 404B indicates that at least one read error has occurred in all of the blocks 202E-H of the flash memory circuit 112B. The block error map 404C indicates that at least one read error has occurred in most of the blocks 202I-L of the flash memory circuit 112C. The block error map 404N indicates that at least one read error has occurred in only one of the blocks 202M-P of the flash memory circuit 112N.

Thus, when an error recovery request is received by the error recovery manager circuit 302 for a page of one of the flash memory circuits 112A-N, such as the flash memory circuit 112A, the error recovery manager circuit 302 retrieves the block error map 404A for the flash memory circuit 112A and sets the bit of the block error map 404A to one for the one of the blocks 202A-D of the flash memory circuit 112A that contains the page. If the bit of the block error map 404A is already set to one, the error recovery manager circuit 302 does not change the block error map 404A.

Accordingly, the error recovery manager circuit 302 may utilize the error counts of the error count table 402 to determine when a sufficiently large sample size of read errors has occurred in one or more of the flash memory circuits 112A-N, such as the flash memory circuit 112A. When the error count of the given flash memory circuit 112A indicates that the sample size of read errors is sufficiently large, the error recovery manager circuit 302 can then retrieve and analyze the block error map 404A corresponding to the flash memory circuit 112A. The analysis of the block error map 404A may be used to determine whether the read errors are occurring in one or a few bad blocks of the flash memory circuit 112A, or the read errors are occurring throughout the flash memory circuit 112A, which may be an indication that the flash memory circuit 112A is going bad and will soon be unusable and/or offline.

Figure 5:
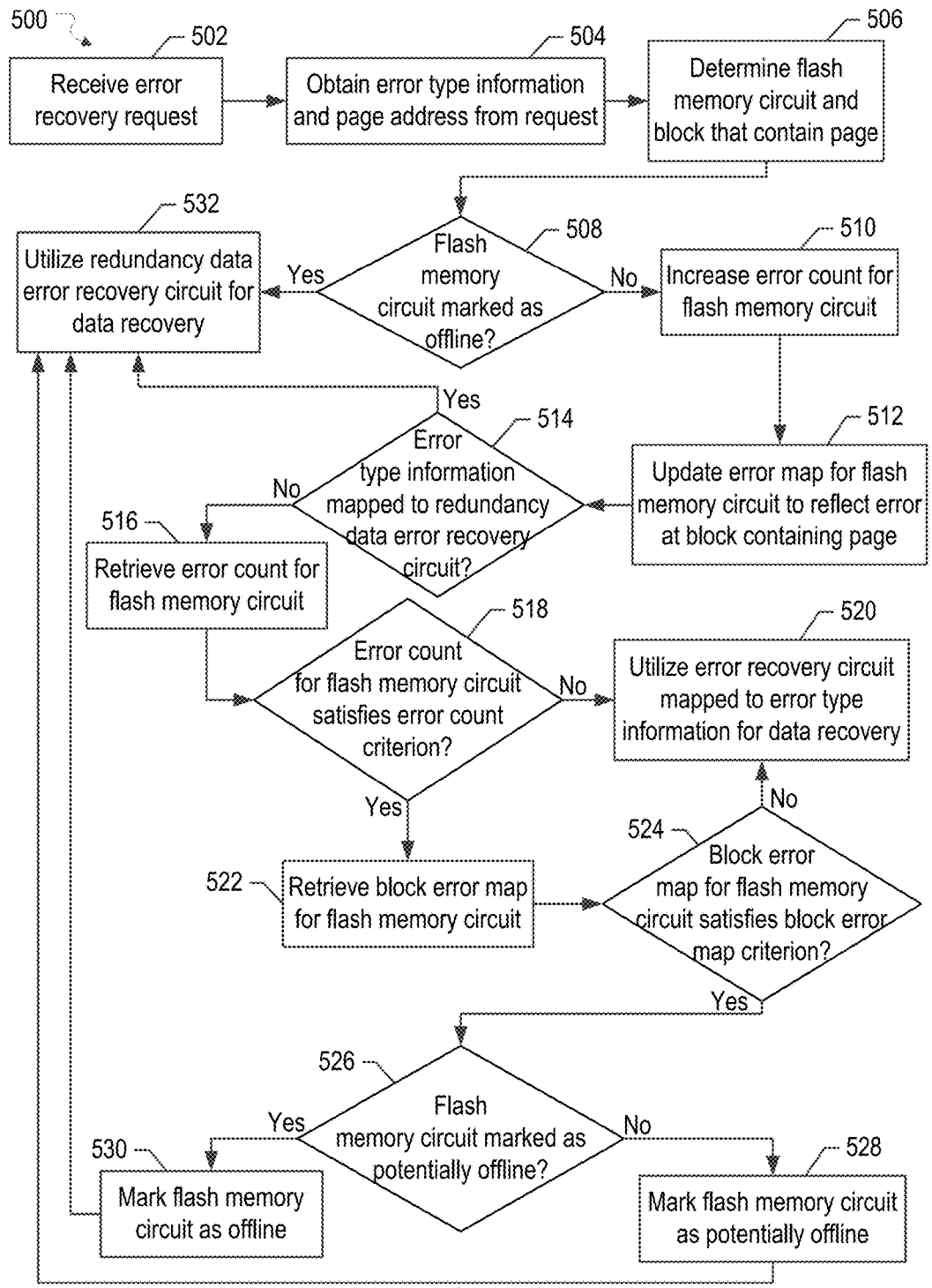
FIG. 5 illustrates a flow diagram of an example process of error recovery handling in accordance with one or more implementations.

FIG. 5 illustrates a flow diagram of an example process 500 of error recovery handling in accordance with one or more implementations. For explanatory purposes, the example process 500 is described herein with reference to the error recovery manager circuit 302 and the error recovery circuits 306A-C of FIG. 3; however, the example process 500 is not limited to the error recovery manager circuit 302 or the error recovery circuits 306A-C of FIG. 3, and one or more blocks of the example process 500 may be performed by one or more other components of the error recovery handler 115 and/or the controller 114. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

The example process 500 begins when the error recovery manager circuit 302 receives an error recovery request (502). For example, the controller 114 may encounter a read error when attempting to read data from one or more pages of one of the blocks 202A-P of one of the flash memory circuits 112A-N, such as a page of the block 202A of the flash memory circuit 112A. Responsive to the read error, the controller 114 generates an error recovery request that includes an address (or otherwise identifies) the page of the block 202A of the flash memory circuit 112A in which the read error occurred, and that includes error type information that indicates the error type of the read error. In one or more implementations, the error type information may also include information indicating whether the read error occurred while attempting to recover the data stored in the page using one of the error recovery circuits 306A-C.

The error recovery manager circuit 302 obtains the error type information and the address of the page from the error recovery request (504). The error recovery manager circuit 302 identifies the flash memory circuit 112A and the block 202A that contain the page, such as based on the address of the page (506). The error recovery manager circuit 302 determines whether the flash memory circuit 112A has been marked as offline (508). For example, when certain criteria are met with respect to the flash memory circuit 112A (as is discussed further below), the error recovery manager circuit 302 may mark the flash memory circuit 112A as offline, such as by storing an indication of the same in the RAM 122. In one or more implementations, the error recovery manager circuit 302 may mark the flash memory circuit 112A as being offline when the criteria is met regardless of whether the flash memory circuit 112A is actually offline (or is potentially going bad and will soon be offline).

If the error recovery manager circuit 302 determines that the flash memory circuit 112A is marked as offline (508), the error recovery manager circuit 302 utilizes the redundancy data error recovery circuit 306C to attempt to recover the data stored in the page identified in the error recovery request irrespective of the one of the error recovery circuits 306A-C that is mapped to the error type information included in the error recovery request (532). If the error recovery manager circuit 302 determines that the flash memory circuit 112A is not marked as offline, the error recovery manager circuit 302 increments the error count for the flash memory circuit 112A, such as in the error count table 402 stored in the RAM 122 (510).

The error recovery manager circuit 302 also updates the block error map for the flash memory circuit 112A, such as the block error map 404A stored in the RAM 122, to reflect that the read error occurred in the block 202A (512). For example, the block error map 404A may be a bitmap that stores a value of 1 at each index corresponding to a block number of a block in which a read error occurred, and stores a value of 0 at each index corresponding to a block number of a block in which a read error has not occurred. Thus, for the block 202A, the error recovery manager circuit may set the bit at the first index (e.g., 0) to a value of 1, if the bit is not already set to a value of 1. If the bit is already set to a value of 1, the value of the bit remains unchanged, e.g., remains a value of 1.

The error recovery manager circuit 302 determines whether the error type information included in the error recovery request is mapped to the redundancy data error recovery circuit 306C (514). Alternatively, or in addition, the error recovery manager circuit 302 may determine whether the error recovery request corresponds to a failed attempt to recover the data stored in the page using the ECC error recovery circuit 306B. In either instance, the error recovery manager circuit 302 utilizes the redundancy data error recovery circuit 306C to attempt to recover the data stored in the page (532).

If the error recovery manager circuit 302 determines that the error type information included in the error recovery request is not mapped to the redundancy data error recovery circuit 306C, the error recovery manager circuit 302 retrieves the error count for the flash memory circuit 112A, such as from the error count table 402 stored in the RAM 122 (516). The error recovery manager circuit 302 determines whether the error count for the flash memory circuit 112A satisfies an error count criterion (518). The error count criterion may be satisfied, for example, when the error count exceeds an error count threshold, such as 2000 errors, 3000 errors, or generally any number of errors. If the error recovery manager circuit 302 determines that the error count for the flash memory circuit 112A does not satisfy the error count criterion (518), the error recovery manager circuit 302 utilizes the one of the error recovery circuits 306A-B that is mapped to the error type information included in the error recovery request to attempt to recover the data stored in the page (520).

In one or more implementations, if the error recovery request was generated from an attempt to recover the data using one of the error recovery circuits 306A-B (e.g., as indicated by the error type information), the error recovery manager circuit 302 may utilize the next error recovery circuit 306B or 306C in error severity, rather than the one of the error recovery circuits 306A-B that is mapped to the error type.

If the error recovery manager circuit 302 determines that the error count for the flash memory circuit 112A satisfies the error count threshold (518), the error recovery manager circuit 302 retrieves the block error map for the flash memory circuit 112A, such as the block error map 404A stored in the RAM 122 (522). The error recovery manager circuit 302 determines whether the block error map 404A for the flash memory circuit 112A satisfies a block error map criterion (524). For example, the block error map criterion may be satisfied when the block error map indicates that read errors have occurred in at least a percentage of the blocks 202A-D of the flash memory circuit 112A, such as at least 80% of the block 202A-D, at least 90% of the blocks 202A-D, or generally at least any percentage of the blocks 202A-D.

Thus, in order to determine the number of blocks 202A-D of the flash memory circuit 112A in which the read errors have occurred, the error recovery manager circuit 302 may have to count the number of indices of the block error map 404A that store a value of 1. Since this analyzing of the block error map 404A may consume processing, memory, and/or power resources of the flash memory device 110, the error recovery manager circuit 302 may only process the block error map 404A when the error count for the flash memory circuit 112A has been determined to satisfy the error count criterion (518), which may be a simpler determination than processing the block error map 404A. Thus, the error count of the flash memory circuit 112A may be considered as a read error sample size when the error count is used to determine whether to expend the processing, memory, and/or power resources on analyzing the block error map 404A for flash memory circuit 112A.

If the error recovery manager circuit 302 determines that the block error map 404A does not satisfy the block error map criterion (524), the error recovery manager circuit 302 utilizes the one of the error recovery circuits 306A-B that is mapped to the error type information included in the error recovery request to attempt to recover the data stored in the page (520). If the error recovery manager circuit 302 determines that the block error map 404A satisfies the block error map criterion (524), the error recovery manager circuit 302 determines whether the flash memory circuit 112A is marked as potentially offline (526).

For example, the first time the error recovery manager circuit 302 determines that both criterions (518, 524) are satisfied for a given flash memory circuit 112A, the error recovery manager circuit 302 marks the flash memory circuit 112A as potentially offline, and the next time that both criterions are satisfied for the flash memory circuit 112A, the error recovery manager circuit 302 marks the flash memory circuit 112A as being offline. Once a given flash memory circuit 112A has been marked as offline, the error recovery manager circuit 302 can move directly to utilizing the redundancy data error recovery circuit 306C for subsequently error recovery requests for pages of the flash memory circuit 112A, thereby bypassing steps (514)-(530)

and conserving the processing, memory, and/or power resources associated therewith.

If the error recovery manager circuit 302 determines that the flash memory circuit 112A is not marked as potentially offline (526), the error recovery manager circuit 302 marks the flash memory circuit 112A as potentially offline, such as by storing an indication of the same in the RAM 122 (528). In one or more implementations, the error recovery manager circuit 302 may reset the error count and the block error map 404A for the flash memory circuit 112A upon marking the flash memory circuit 112A as being potentially offline. Alternatively, or in addition, the error recovery manager circuit 302 may reset all of the error counts stored in the error count table 402, and all of the error maps 404A-N on a periodic basis, such as every 500 milliseconds, 1 second, 5 seconds, 10 seconds, or any amount of time. However, the indications of whether the flash memory circuits 112A-N are offline or potentially offline may not be reset at the periodic intervals.

If the error recovery manager circuit 302 determines that the flash memory circuit 112A is marked as potentially offline (526), the error recovery manager circuit 302 marks the flash memory circuit 112A as offline, such as by storing an indication of the same in the RAM 122 (530). After marking the flash memory circuit 112A as potentially offline or offline, the error recovery manager circuit 302 utilizes the redundancy data error recovery circuit 306C to attempt to recover the data stored in the page identified in the error recovery request irrespective of the one of the error recovery circuits 306A-C that is mapped to the error type information included in the error recovery request (532).

In one or more implementations, the outcome of the error count determination (518) and the outcome of the block error map determination (524) may be collectively indicative of a likelihood that the data stored in the page can be recovered using the one of the error recovery circuits 306A-B that is mapped to the error type information of the error recovery request. For example, when the error count does not satisfy the error count criterion (518) or the block error map does not satisfy the error map criterion (524), the error recovery manager circuit 302 may determine that the likelihood is high that the page can be recovered using the one of the error recovery circuits 306A-B that is mapped to the error type information of the error recovery request. In such instances, the high likelihood may be construed as satisfying a likelihood criterion and the error recovery manager circuit 302 may attempt to recover the data using the one of the error recovery circuits 306A-B that is mapped to the error type information of the error recovery request.

However, when the error count satisfies the error count criterion and the block error map satisfies the error map criterion, the error recovery manager circuit 302 may determine that there is a low likelihood that the data can be recovered using the one of the error recovery circuits 306A-B that is mapped to the error type information included in the error recovery request (520). In this instance, the error recovery manager circuit 302 may determine that the low likelihood does not satisfy the likelihood criterion and the error recovery manager circuit 302 utilizes the redundancy data error recovery circuit to attempt to recover the data (532), rather than the one of the error recovery circuits 306A-B that is mapped to the error type information included in the error recovery request.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   at least one processor configured to:
      receive an error recovery request comprising error type information and an address of a page of a flash memory circuit for which a read error has occurred, wherein the error type information of the error recovery request is mapped to a first error recovery technique;
      determine whether an error count associated with the flash memory circuit satisfies a first criterion and a block error map associated with the flash memory circuit satisfies a second criterion, wherein the error count indicates a number of read errors that have occurred on the flash memory circuit and the block error map indicates one or more blocks of the flash memory circuit in which the read errors have occurred; and
      utilize a second error recovery technique to attempt to recover data stored in the page when the first and second criterions are satisfied, otherwise utilize the first error recovery technique to attempt to recover the data stored in the page, wherein the second error recovery technique is associated with recovering data stored in an offline flash memory circuit.

2. The device of claim 1, wherein the at least one processor is further configured to:
   utilize the second error recovery technique to attempt to recover the data stored in the page when the first and second criterions are satisfied irrespective of whether the flash memory circuit is offline.

3. The device of claim 1, wherein the second error recovery technique differs from the first error recovery technique.

4. The device of claim 1, wherein the at least one processor is further configured to:

increment the error count associated with the flash memory circuit prior to determining whether the error count satisfies the first criterion.

5. The device of claim 4, wherein the at least one processor is further configured to:
  determine a block of the flash memory circuit that includes the page; and
  update the block error map associated with the flash memory circuit to reflect that the read error occurred in the block of the flash memory circuit prior to determining whether the block error map associated with the flash memory circuit satisfies the second criterion.

6. The device of claim 1, wherein the at least one processor is further configured to:
  determine whether the flash memory circuit has been marked as potentially offline when the first and second criterions are satisfied; and
  mark the flash memory circuit as offline when the first and second criterions are satisfied and the flash memory circuit has been marked as potentially offline, otherwise mark the flash memory circuit as potentially offline when the first and second criterions are satisfied and the flash memory circuit has not been marked as potentially offline.

7. The device of claim 6, wherein the at least one processor is further configured to:
  determine, responsive to receipt of the error recovery request, whether the flash memory circuit is marked as offline; and
  utilize the second error recovery technique to attempt to recover the page when the flash memory circuit is marked as offline without determining whether the first and second criterions are satisfied.

8. The device of claim 1, wherein the at least one processor is further configured to:
  reset, on a periodic basis, the error count associated with the flash memory circuit and the block error map associated with the flash memory circuit.

9. The device of claim 1, further comprising a memory configured to store the error count associated with the flash memory circuit and the block error map associated with the flash memory circuit, wherein the block error map associated with the flash memory circuit comprises a bitmap.

10. The device of claim 1, wherein the at least one processor is further configured to:
  determine whether the error count associated with the flash memory circuit satisfies the first criterion prior to determining whether the block error map associated with the flash memory circuit satisfies the second criterion; and
  bypass determining whether the block error map satisfies the second criterion when the error count fails to satisfy the first criterion.

11. The device of claim 1, wherein the at least one processor is further configured to:
  determine that the error count associated with the flash memory circuit satisfies the first criterion when the error count associated with the flash memory circuit exceeds a first threshold; and
  determine that the block error map associated with the flash memory circuit satisfies the second criterion when the block error map indicates that at least a number of the one or more blocks of the flash memory circuit in which the read errors have occurred exceeds a second threshold.

12. A computer-implemented method comprising:
  receiving, by a controller of a flash memory circuit, an error recovery request corresponding to a page of the flash memory circuit, wherein the error recovery request indicates an error type that is mapped to a first error recovery technique;
  retrieving, by the controller, an error count associated with the flash memory circuit and a block error map associated with the flash memory circuit, wherein the error count indicates a number of read errors that have occurred on the flash memory circuit and the block error map indicates one or more blocks of the flash memory circuit in which the read errors have occurred;
  determining, by the controller, a likelihood that data stored in the page of the flash memory circuit can be recovered using the first error recovery technique based at least in part on the error count and the block error map;
  when the likelihood that the data stored in the page of the flash memory circuit can be recovered using the first error recovery technique satisfies a criterion, utilizing, by the controller, the first error recovery technique to attempt to recover the data stored in the page of the flash memory circuit, otherwise utilizing a second error recovery technique to attempt to recover the data stored in the page of the flash memory circuit without utilizing the first error recovery technique; and
  determining that the likelihood that the data stored in the page of the flash memory circuit can be recovered using the first error recovery technique satisfies the criterion when the error count is below a first threshold and a number of the one or more blocks of the flash memory circuit in which the read errors have occurred is below a second threshold.

13. The computer-implemented method of claim 12, further comprising:
  setting, at predetermined intervals, the error count associated with the flash memory circuit to zero and clearing, at the predetermined intervals, the block error map associated with the flash memory circuit.

14. The computer-implemented method of claim 12, wherein the first error recovery technique is different than the second error recovery technique.

15. The computer-implemented method of claim 14, wherein the second error recovery technique is associated with recovering data stored in an offline flash memory circuit.

16. The computer-implemented method of claim 15, wherein the second error recovery technique comprises a redundant array of independent disks (RAID) recovery technique.

17. The computer-implemented method of claim 12, further comprising:
  storing, by the controller, an indication that the flash memory circuit is unavailable for error recovery when the likelihood that the data stored in the page of the flash memory circuit can be recovered using the first error recovery technique fails to satisfy the criterion.

18. A system comprising:
  flash memory circuits each comprising blocks, each of the blocks including one or more pages;
  a random access memory (RAM) configured to store: a mapping between error types and error recovery techniques, an error count for each of the flash memory circuits, and a block error map for each of the flash memory circuits, wherein the error count for each respective flash memory circuit indicates a number of read errors that have occurred on each respective flash memory circuit and the block error map for each respective flash memory circuit indicates each of the blocks of each respective flash memory circuit in which at least one of the read errors has occurred;

an interface communicatively coupled to a host device; and a controller configured to:

receive error recovery requests corresponding to read errors that have occurred on the flash memory circuits, each of the error recovery requests indicating a page of one of the flash memory circuits and one of the error types; and for each of the error recovery requests:

identify one of the error recovery techniques mapped to the one of the error types;

determine whether the error count for the one of the flash memory circuits on which the corresponding read error occurred exceeds a first threshold and whether the block error map for the one of the flash memory circuits indicates that the read errors occurred in at least a number of the blocks of the one of the flash memory circuits; and utilize another one of the error recovery techniques to attempt to recover data stored in the page when the error count exceeds the first threshold and the block error map indicates that the read errors occurred in the at least the number of the blocks, otherwise utilize the one of the error recovery techniques to attempt to recover the data stored in the page.

19. The system of claim 18, wherein the controller is further configured to:

reset, at periodic intervals, the error count and the block error map for each of the flash memory circuits.

20. A system comprising:

means for receiving an error recovery request comprising error type information and an address of a page of a flash memory circuit for which a read error has occurred, wherein the error type information of the error recovery request is mapped to a first error recovery technique;

means for determining whether an error count associated with the flash memory circuit satisfies a first criterion and a block error map associated with the flash memory circuit satisfies a second criterion, wherein the error count indicates a number of read errors that have occurred on the flash memory circuit and the block error map indicates one or more blocks of the flash memory circuit in which the read errors have occurred; and means for utilizing a second error recovery technique to attempt to recover data stored in the page when the first and second criterions are satisfied, otherwise utilizing the first error recovery technique to attempt to recover the data stored in the page, wherein the second error recovery technique is associated with recovering data stored in an offline flash memory circuit.

* * * * *